Dec. 28, 1965 K. H. CARPENTER ETAL 3,226,498
BRUSH AND SEALING MEANS FOR AN ELECTRIC SPEEDOMETER ASSEMBLY
Filed Feb. 19, 1962 3 Sheets-Sheet 2
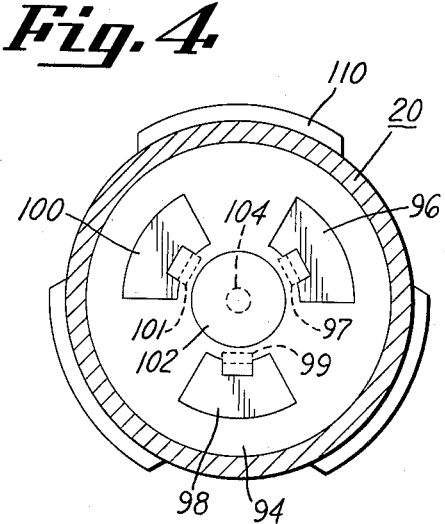
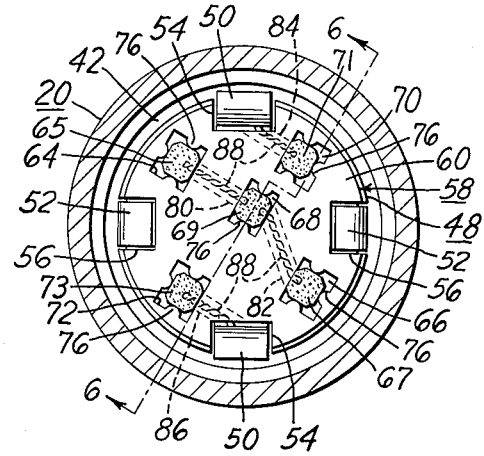
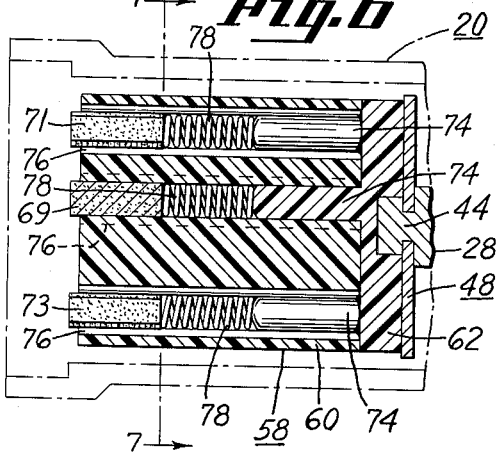
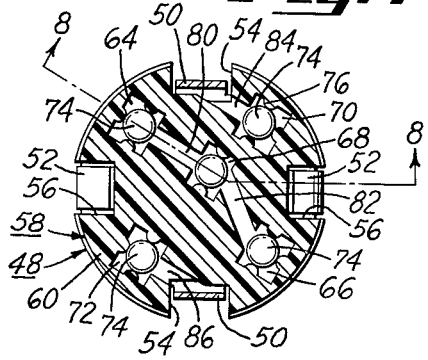
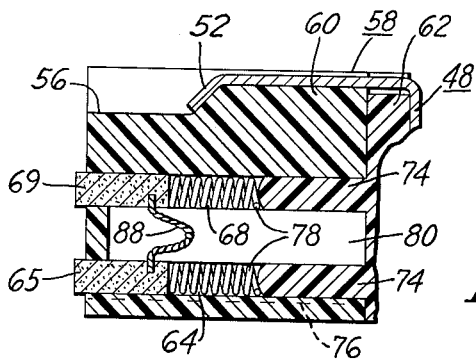
INVENTORS
KEITH H. CARPENTER
WILLIAM E. FRITZ
BY FRANK J. TERKOSKI
THEIR ATTORNEY Dec. 28, 1965   K. H. CARPENTER ETAL   3,226,498
BRUSH AND SEALING MEANS FOR AN ELECTRIC SPEEDOMETER ASSEMBLY
Filed Feb. 19, 1962
3 Sheets-Sheet 3

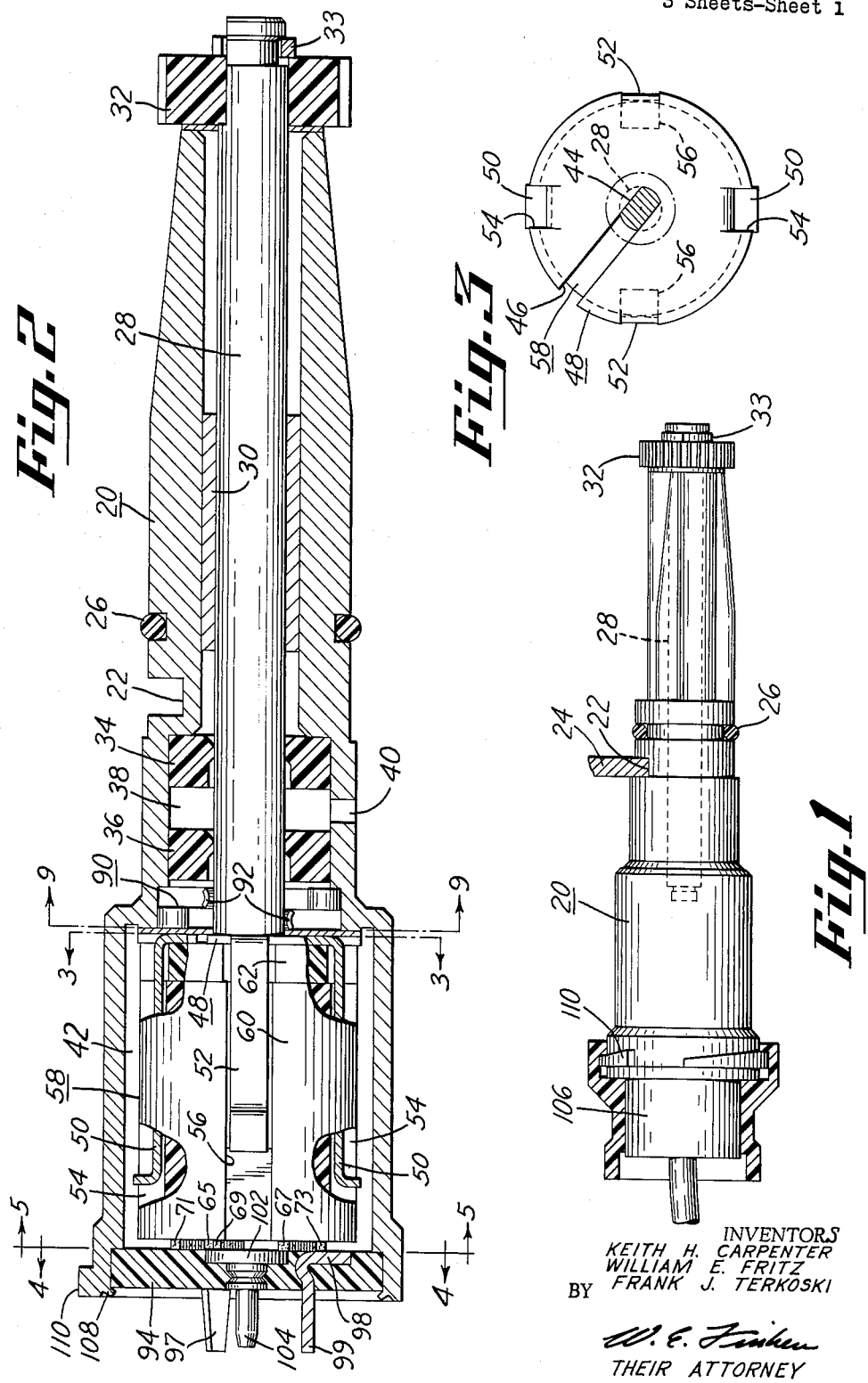

INVENTORS
KEITH H. CARPENTER
WILLIAM E. FRITZ
BY FRANK J. TERKOSKI

THEIR ATTORNEY

United States Patent Office 3,226,498
Patented Dec. 28, 1965

3,226,498
BRUSH AND SEALING MEANS FOR AN ELECTRIC SPEEDOMETER ASSEMBLY
Keith H. Carpenter, Pittsford, and William E. Fritz and Frank J. Terkoski, Rochester, N.Y., assignors to General Motors Corporation, Detroit, Mich., a corporation of Delaware
Filed Feb. 19, 1962, Ser. No. 174,198
8 Claims. (Cl. 200—24)

This invention pertains to electric converters, and particularly to an improved transmitter assembly for converting direct current to double frequency, three phase alternating current.

Heretofore, electric speedometer drives embodying a transmitter and a remotely located receiver have been installed in vehicles as a replacement for a conventional speedometer drive cable. A speedometer drive of this type is disclosed in copending application Serial No. 857,012 filed December 3, 1959, in the names of William E. Fritz et al. and assigned to the assignee of this invention now Patent No. 3,108,216. The present invention relates to an improved transmitter construction for use in an electric speedometer drive of the aforesaid type which embodies an improved oil seal, an improved brush holder, and operates to produce a double frequency alternating current signal.

Accordingly, among our objects are the provision of an improved electric transmitter for converting direct current into double frequency alternating current; the further provision of an electric transmitter embodying only five brushes; the provision of an improved brush holder for an electric transmitter; and the still further provision of an improved oil seal for an electric transmitter used in an electric speedometer drive system.

The aforementioned and other objects are accomplished by arranging the commutator segments and brushes so as to obtain two cycles of staircase wave formation per revolution of the brush drum thereby doubling the frequency of the output signal. Specifically, the transmitter comprises a three segment face commutator which is engageable by four brushes carried by a rotatable brush holder. A fifth brush carried by the brush holder engages an annular slip ring. Three of the brushes are electrically interconnected by brush shunts, including diametrically opposed brushes and the center brush. The other two brushes are also electrically interconnected and displaced 90° from the three interconnected brushes.

The brush holder is designed so that substantially line contact is maintained between the brush and the brush holder, and the brushes are urged against the commutator segment with a minimum pressure. Moreover, since the transmitter is adapted to be driven directly from a power takeoff in the transmission, a double oil seal is embodied in the transmitter housing so as to preclude leakage of transmission fluid to the commutating surfaces.

Further objects and advantages of the present invention will be apparent from the following description, reference being had to the accompanying drawings wherein a preferred embodiment of the invention is clearly shown and wherein similar reference numerals depict similar parts throughout the several views.

In the drawings:

FIGURE 1 is a longitudinal view in elevation of the improved electric transmitter.

FIGURE 2 is an enlarged longitudinal view, partly in section and partly in elevation, of the transmitter shown in FIGURE 1.

FIGURE 3 is a sectional view taken along line 3—3 of FIGURE 2.

FIGURES 4 and 5 are sectional views taken along lines 4—4 and 5—5 of FIGURE 2.

FIGURE 6 is a sectional view taken along the line 6—6 of FIGURE 5.

FIGURE 7 is a sectional view taken along line 7—7 of FIGURE 6.

FIGURE 8 is a fragmentary sectional view taken along line 8—8 of FIGURE 7.

FIGURE 9 is a sectional view taken along line 9—9 of FIGURE 2.

Figure 10:
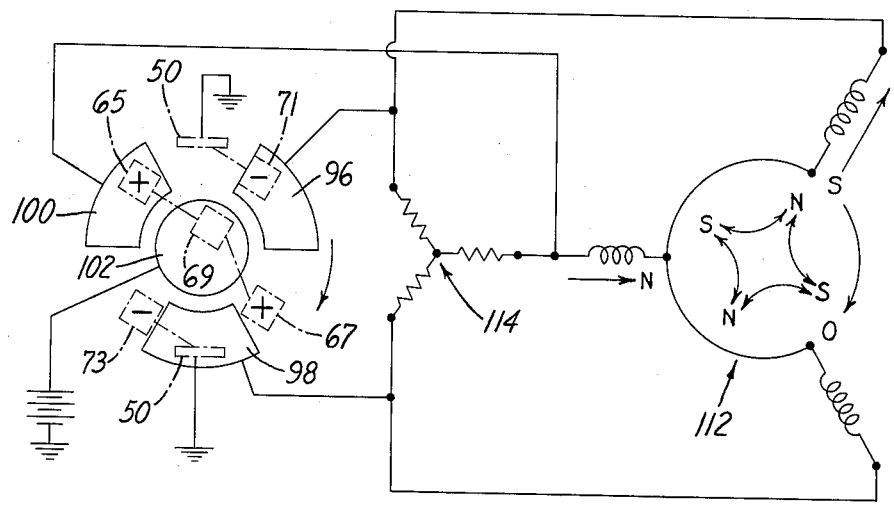

FIGURE 10 is an electrical schematic of a speedometer drive system utilizing the improved electric transmitter.

Figure 11:
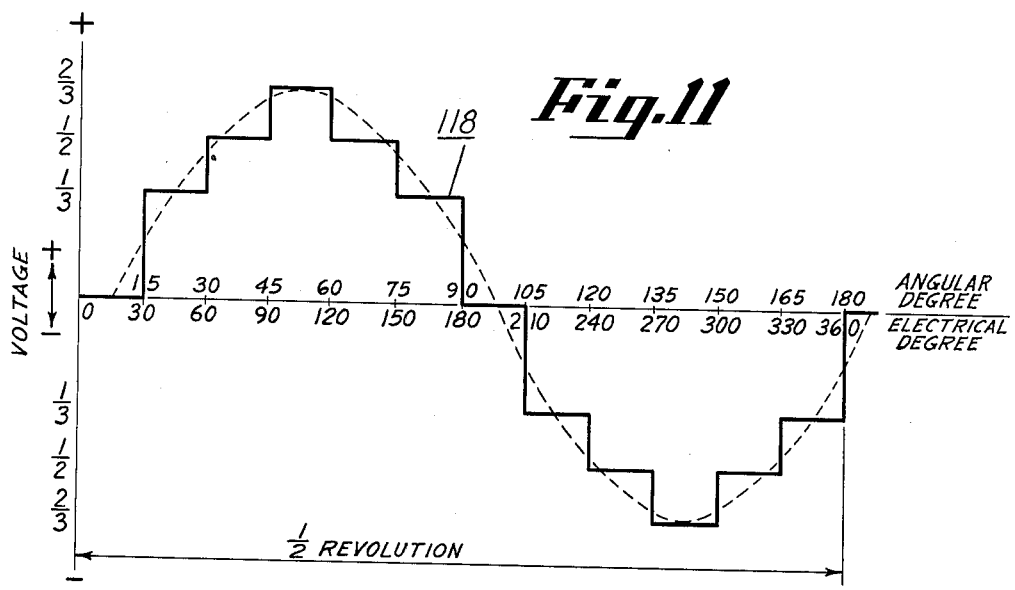

FIGURE 11 is a graph indicating the staircase wave form produced by the electric transmitter.

Referring to FIGURES 1 and 2, the electric transmitter comprises a metallic housing 20 having a mounting groove 22 in the right-hand portion whereby the housing 20 can be attached to a transmission housing bracket 24. The housing 20 carries an O-ring seal 26 adapted to engage the periphery of an aperture through the transmission housing, not shown, and as shown in FIGURE 2 a drive shaft 28 is rotatably supported within the housing by a sleeve bearing 30. A drive pinion 32 is attached to the inner end of the shaft 28 by a split ring 33, the pinion 32 meshing with a suitable power takeoff within the vehicle transmission so as to rotate at a speed proportional to vehicle road speed.

Since a portion of the transmitter housing 20 is disposed within the transmission housing, it is exposed to the transmission fluid and to prevent leakage along the shaft 28 into the converter components, the improved transmitter embodies two axially spaced lip-type oil seals 34 and 36 which engage the shaft 28. The space 38 between the two seals 34 and 36 is filled with grease, and the oil leaking by the first seal 34 flows into the grease cavity 38 from which it can drain through a side wall aperture 40. In this manner the second seal 36 is not subjected to the static head of fluid in the transmission while being lubricated by the grease within the cavity 38. The tandem seal arrangement virtually precludes leakage of transmission fluid into the cup-shaped portion 42 of the transmitter housing containing converter components.

The drive shaft 28, as seen in FIGURE 3, has a flat portion 44 extending through a radial slot 46 of a drive plate 48 having four circumferentially spaced axially extending fingers arranged in diametrically opposed sets 50 and 52. The sets of fingers 50 and 52 mate with sets of axially extending grooves 54 and 56 of a brush drum 58 disposed within the cup-shaped recess 42. The brush drum is composed of suitable insulating material. By reason of the sets of fingers 50 and 52 of the drive plate being disposed in the sets of grooves 54 and 56 in the brush drum 58, the brush drum is connected for rotation with the drive plate 48. The ends of the fingers 50 are bent radially outward, whereas the ends of fingers 52 are bent radially inward, the arrangement being more clearly shown in FIGURE 8 from which it is apparent that the outer ends of fingers 52 prevent relative axial movement between the drive plate 48 and the brush drum 58.

The brush drum 58 is made in two parts 60 and 62, the part 60 being substantially cylindrical and having five through holes 64, 66, 68, 70 and 72. The part 62 comprises a plate having five axial projections 74 mating with the five holes in the part 60. The end of the drive shaft 28 pilots in the part 62 as seen in FIGURE 6. It will also be noted that the radially inward bent ends of the finger 52 maintain the parts 60 and 62 in assembled relation.

As alluded to hereinbefore, the improved transmitter requires only five brushes 65, 67, 69, 71 and 73. In order to reduce friction between the brushes and the brush drum, the through holes 64, 66, 68, 70 and 72 are formed with arcuate ribs 76 resulting in substantially "line" contact between the brushes and the brush holder. The brushes are thus restrained against rotation relative to the holder while frictional resistance to movement of the brushes relative to the holder is minimized. Each of the brushes 65, 67, 69, 71 and 73 is urged axially outward of the brush drum by a relatively light coil spring 78 disposed between the inner end of each brush and the outer end of a projection 74 on the part 62. The cylindrical part 60 is also formed with intermediate slots 80, 82, 84 and 86. The slots 80 and 82 connect the through holes 64 and 66 with the through hole 68. The slots 84 and 86 connect the through holes 70 and 72 with the peripheral slots 54, as clearly shown in FIGURE 7. These slots 80, 82, 84 and 86 accommodate the brush shunts, or pigtails 88, the pigtails on brushes 71 and 73 connecting these brushes to the fingers 50, and the pigtails on brushes 65 and 67 connecting these brushes to the center brush 69.

The ground connection for the electric transmitter comprises a ring of spring-like material 90 assembled in a groove in the base of the cup-shaped recess 42, and having a pair of leaf spring fingers 92 engaging the shaft 28. Since the drive shaft 28 is electrically and mechanically connected to the metallic drive plate 48, and the housing is grounded, the pair of fingers 50 are used to connect the brushes 71 and 73 to ground potential, it being noted that brushes 71 and 73 are diametrically opposed. The brushes 65 and 67 are also diametrically opposed, and are connected to the positive terminal of the power supply in a manner to be described. Thus, it will be apparent that the positive and negative brushes are spaced apart 90 mechanical degrees, while like polarity brushes are spaced apart 180 mechanical degrees.

The transmitter also includes a commutator comprising a disc of insulating material 94 which, as seen in FIGURE 4, has three commutating segments 96, 98 and 100, each subtending an angle of 60° and spaced 120° apart. The commutator also includes a center slip ring 102 to which the positive terminal of the power supply 104 is connected. Each of the three commutator segments 96, 98 and 100 has a terminal 97, 99 and 101 protruding therefrom, and the terminals 97, 99, 101 and 104 receive a connector 106 as shown in FIGURE 1. The commutator 94 is assembled and secured to the housing 20 by staking over the lip of the housing as indicated by numeral 108. The connector body 106 may be maintained in assembled relation with the housing 20 by a suitable threaded coupling indicated by numeral 110.

It will be apparent that the improved electric transmitter employs substantially fewer parts than the transmitter disclosed in the aforementioned copending application; is more readily adapted to mass production assembly; and can be made of an appreciably smaller over-all size so as to be more readily adapted for use in different installations. In addition, the improved transmitter produces a double frequency alternating current signal thereby substantially improving the overall operation of the speedometer drive system, particularly at low vehicle speeds, where the speedometer pointed has a tendency to follow the pulses of the exciting signal.

With particular reference to FIGURES 10 and 11, the manner in which the double frequency signal is obtained with the improved electric transmitter will be described. The commutator 94 has three segments 96, 98 and 100, each subtending an angle of 60° and spaced 120° apart. The face commutator is stationary and the four brushes 65, 67, 71 and 73 rotate relative thereto and engage the three commutator segments. The brush 69 continuously engages the slip ring 102. The brushes 65, 67, 71 and 73 are spaced 90 mechanical degrees apart so that the trailing edges coincide with the same radius on the brush drum. The receiver motor 112 is shown schematically in FIGURE 10 as having three salient poles with a four pole rotor. The three exciting windings of the receiver motor 112 are electrically connected to the commutator segments, and also to a star connected resistor network 114.

Referring more particularly to FIGURE 11, upon rotation of the brush drum relative to the commutator, a staircase wave signal 118 is generated through a complete cycle (360 electrical degrees) for every one-half revolution of the brush drum. This is achieved by reason of the angular orientation of the four brushes 65, 67, 71 and 73 and angular orientation of the three commutator segments 96, 98 and 100 whereby the signal generated changes during every 15° rotation between the brush drum and the commutator. The star resistance network 114, comprising parallel connected resistors, reduces arcing between the commutator and the brushes thereby eliminating radio interference, and also assisting in dissipating the magnetic energy during deenergization of the windings of the receiver motor. The graph in FIGURE 11 depicts a staircase wave from which approaches a sine wave appearing across one of the windings of the receiver motor, it being understood that the same staircase wave form is produced across the other two windings of the motor, shifted 120 and 240 electrical degrees, with respect to the wave form shown in FIGURE 11. In this manner it is apparent that the receiver motor 112 will exactly follow rotation of the transmitter as long as it is not mechanically overloaded.

While the embodiment of the invention as herein disclosed constitutes a preferred form, it is to be understood that other forms might be adopted.

What is claimed is as follows:

1. A brush drum assembly for an electric speedometer drive comprising, a cylindrical part of insulating material having a plurality of through holes substantially rectangular in cross-section having longitudinally extending arcuate ribs, a second part of insulating material having a plurality of longitudinally extending projections equal in number to the number of through holes in said cylindrical part, said projections extending into the through holes from one end of said cylindrical part, a brush disposed in each through hole of said cylindrical part and having substantial line contact with the side walls thereof, a coil spring disposed between the inner ends of each brush and each projection on a second brush part, and means maintaining the two parts in assembled relation.

2. A transmitter for an electric speedometer drive including, a housing having a cup-shaped recess, a rotatable brush drum assembly coaxially disposed within said recess and having two sets of diametrically opposed longitudinally extending slots, a drive shaft rotatably supported in said housing, a drive plate connected to said drive shaft and having a plurality of axially extending fingers engaging the slots in said brush drum assembly for imparting rotation thereto.

3. A transmitter for an electric speedometer drive including, a housing having a cup-shaped recess, a rotatable brush drum assembly coaxially disposed within said recess and having diametrically opposed sets of longitudinally extending grooves, a drive shaft rotatably supported in said housing, a drive plate connected to said drive shaft and having diametrically opposed sets of longitudinally extending fingers disposed in the grooves of said brush drum assembly for imparting rotation thereto, a commutator attached to said housing having a plurality of circumferentially spaced commutator segments and a center coaxial slip ring, a plurality of first brush means carried by said brush drum assembly and engaging said commutator segments, second brush means carried by said brush drum assembly engaging said center slip ring, certain of said first brush means being electrically connected to said second brush means, a spring ring having finger means engaging said drive shaft, and means including said drive plate interconnecting other of said first brush means with said spring ring.

4. A transmitter for an electric speedometer drive including, a housing, a rotatable brush assembly disposed within said housing, a drive shaft rotatably supported in said housing, means drivingly interconnecting said drive shaft and said brush assembly, and sealing means engaging said drive shaft comprising a pair of axially spaced lip-type seals arranged in tandem with a cavity therebetween, and a drain port in said housing communicating with said cavity.

5. The electric speedometer drive set forth in claim 4 wherein said cavity is filled with grease.

6. A rotatable brush drum assembly for an electric speedometer drive including, first and second parts of insulating material, one of said parts having a substantially cylindrical configuration with a plurality of through holes, each of said through holes being substantially rectangular in cross-section and having a plurality of longitudinally extending arcuate ribs, the other of said parts having a plurality of longitudinally extending projections equal in number to the number of said through holes, a brush disposed in each through hole having substantially line contact with its respective through hole, a coil spring disposed between the inner end of each brush and each of said projections, and a drive plate having means interlocked with said brush drum for holding said two parts in assembled relation and for imparting rotation thereto.

7. A rotatable brush drum assembly for an electric speedometer drive including, first and second parts of insulating material, one of said parts having a substantially cylindrical configuration with a plurality of through holes and a plurality of axially extending peripheral grooves, the other of said parts having a plurality of longitudinally extending projections equal in number to the number of said through holes, a brush disposed in each through hole, a coil spring disposed between the inner end of each brush and each of said projections, and a drive plate having a plurality of axially extending fingers crimped into said axially extending peripheral grooves so as to retain said two parts in assembled relation and for imparting rotation thereof.

8. A rotatable brush drum assembly for an electric speedometer drive including, first and second parts of insulating material, one of said parts having a substantially cylindrical configuration with five through holes, four of said through holes being arranged adjacent the periphery thereof and spaced 90 mechanical degrees apart and one through hole being located substantially centrally thereof, said part of cylindrical configuration having two radial slots interconnecting one pair of diametrically opposed through holes with said center through hole, said part of cylindrical configuration having a plurality of longitudinally extending peripheral grooves and a pair of slots connecting the other pair of diametrically opposed through holes with said longitudinally extending peripheral grooves, the other of said parts having a plurality of longitudinally extending projections equal in number to the number of said through holes, a brush disposed in each through hole, a coil spring disposed between the inner end of each brush and each of said projections, and a drive plate having means interlocked with said brush drum for holding said two parts in assembled relation and for imparting rotation thereto.

References Cited by the Examiner
UNITED STATES PATENTS

| | | | |
|---|---|---|---|
| 880,705 | 3/1908 | Woodbridge | 321—49 |
| 1,100,949 | 6/1914 | Briggs. | |
| 2,008,053 | 7/1935 | Whiteside | 200—14 X |
| 2,493,354 | 1/1950 | McCoy | 321—49 |
| 2,752,435 | 6/1956 | Kalmus et al. | 200—26 |
| 2,965,725 | 12/1960 | Mason | 200—26 |

BERNARD A. GILHEANY, *Primary Examiner.*

LLOYD McCOLLUM, *Examiner.*